United States Patent [19]

Parker

[11] Patent Number: 4,469,257

[45] Date of Patent: Sep. 4, 1984

[54] SKI RACK DEVICE FOR PICKUP TRUCKS

[76] Inventor: Barry R. Parker, 908 E. Arques, Sunnyvale, Calif. 94086

[21] Appl. No.: 470,215

[22] Filed: Feb. 28, 1983

[51] Int. Cl.³ .......................................... B65D 43/08
[52] U.S. Cl. ......................... 224/42.45 R; 224/42.38; 224/917; 224/311; 211/60 SK
[58] Field of Search ..................... 224/42.45 R, 42.24, 224/42.32, 42.38, 42.39, 42.03 R, 42.07, 311, 917; 211/60 R, 60 SK

[56] References Cited

U.S. PATENT DOCUMENTS

| 1,959,611 | 5/1934 | Brengel | 224/42.38 |
| 2,678,150 | 5/1954 | Lund | 224/42.45 R |
| 4,366,923 | 1/1983 | Koch | 224/42.24 |

FOREIGN PATENT DOCUMENTS 744882  1/1933  France ............................. 224/42.32

Primary Examiner—Steven M. Pollard
Attorney, Agent, or Firm—Paul L. Hickman

[57] ABSTRACT

A ski rack for pickup trucks characterized by a separated pair of ski carrier assemblies each including an elongated support post, a base assembly for attaching a lower end of the support post to the bed of the pickup truck, and a ski attachment assembly attached to an upper end of the support post. The support posts are preferably angled towards each other over the wheel well hump and are angled towards the center of the bed so that the ski attachment assemblies clear the upper edge of the pickup truck's sidewall. A number of locking mechanisms are provided to lock the base assembly to the bed and ski equipment to the ski attachment assembly.

13 Claims, 5 Drawing Figures

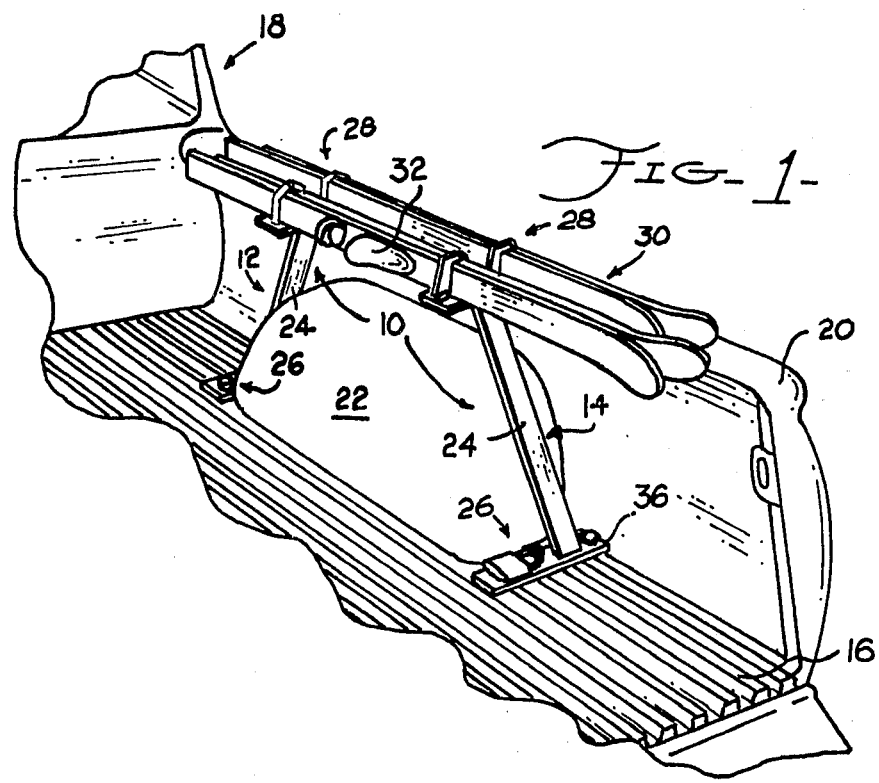
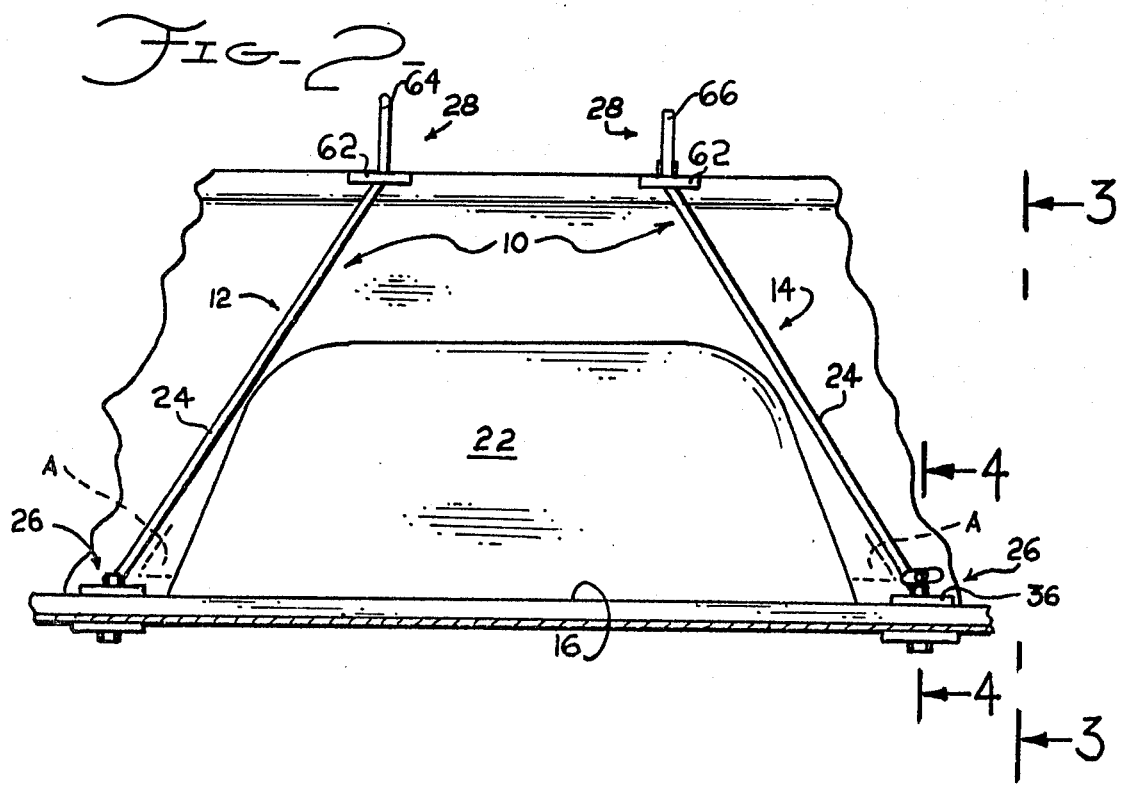

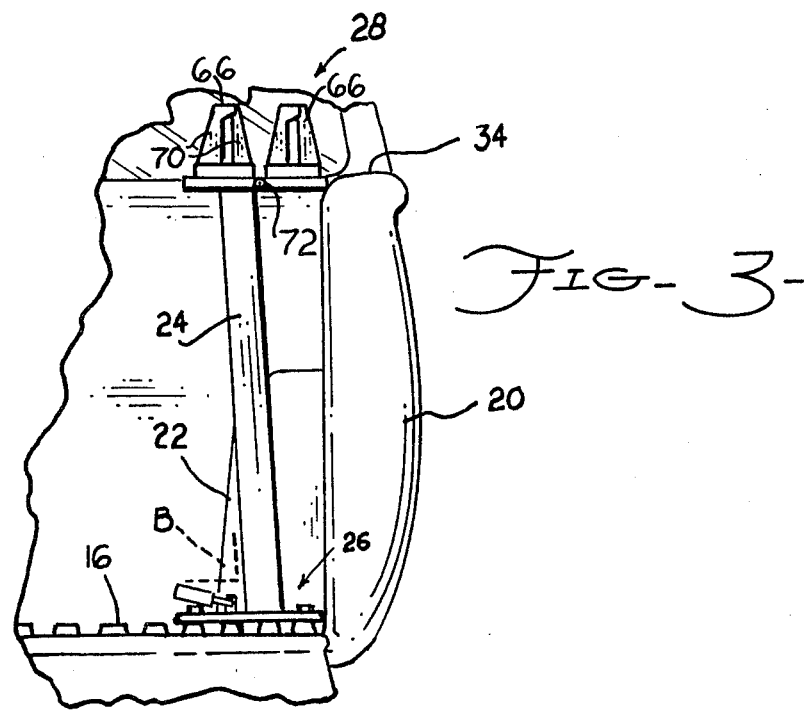
FIG-3-
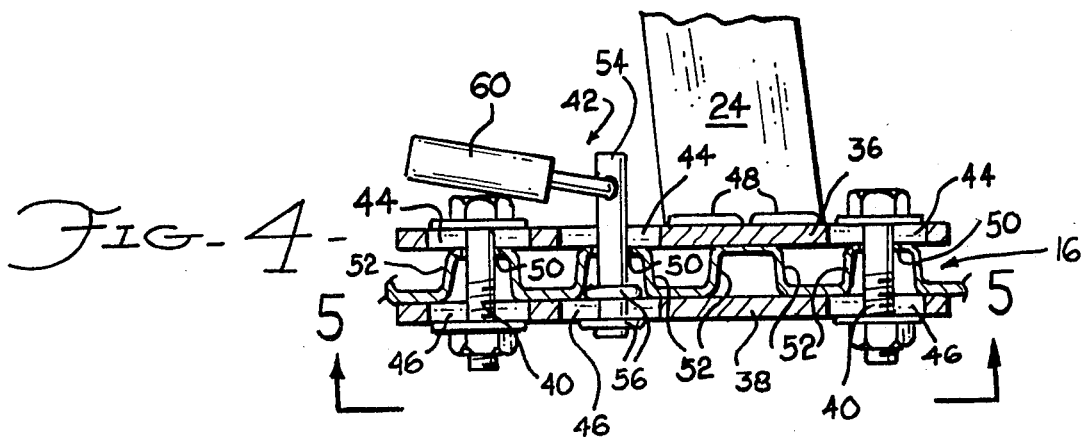
FIG-4-
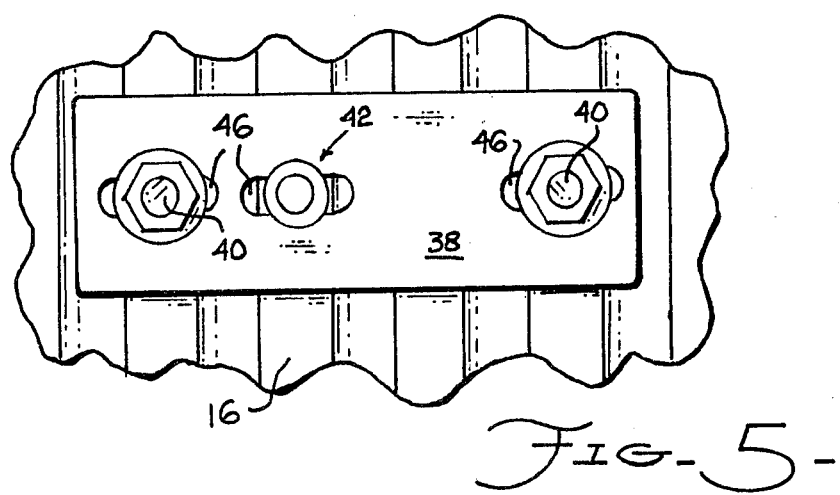
FIG-5-

SKI RACK DEVICE FOR PICKUP TRUCKS

BACKGROUND OF THE INVENTION

1. Field of the Invention

This invention relates generally to racks and more particularly to racks for mounting skis on a vehicle.

2. Description of the Prior Art

There are many types of ski racks for attaching one or more pairs of skis to a vehicle. A common type of ski rack has two, separated ski carrier assemblies which mount over the roof of an automobile by clamping to the rain gutters on either side of the roof. This type of ski rack is capable of holding a number of pairs of skis and poles horizontal to the automobile's roof. The ski rack is usually provided with a lock to prevent the rack and skis from being stolen.

While the type of ski rack described above is quite adequate for most passenger vehicles it is not well adapted for pickup trucks. The roof of a pickup truck is usually too short accommodate a standard ski rack. As a consequence, most pickup truck owners are forced to carry their skis on the bed of their pickup truck.

Unfortunately, skis loosely placed on the bed of a pickup truck tend to bounce around and become damaged. Furthermore, the skis are not protected against theft, as they could be if they were locked into a ski rack. Also, if the length of the skis are longer than the length of the pickup truck bed they do not fit into the truck. Lastly, carrying skis on the bed of the pickup truck reduces the amount of cargo that could otherwise be carried by the truck.

SUMMARY OF THE INVENTION

An object of this invention is to provide a ski rack for a pickup truck.

Another object of this invention is to provide a ski rack device as described above which is itself resistant to theft and which prevents unauthorized removal of ski equipment from the device.

Yet another object of this invention is to provide a ski rack which will hold skis that are longer than the length of the pickup truck bed.

A further object of this invention is to provide a ski rack which doesn't take up much space on the bed of the truck so that the amount of cargo that can be carried by the truck is not substantially reduced.

A still further object of this invention is to provide a ski rack which supports the skis above the bed of the pickup truck to prevent them from becoming damaged.

Briefly, the invention comprises a separated pair of ski support assemblies attached to the bed of a pickup truck near one of the trucks sidewalls. Each ski carrier assembly includes an elongated support post having an upper end and a lower end, a base assembly attaching the lower end of the support post to the pickup truck bed, and a ski attachment assembly attached to the upper end of the support post. On trucks having wheel well humps rising from the bed, one support post is attached in front of a wheel well hump, and the other support post is attached behind the wheel well hump. The support posts are preferably angled towards each other so that the skis can be supported near their bindings but are far enough apart so that the bindings of two adjacent pairs of skis may be offset to prevent mutual interference. Furthermore, by having the supports no more than 38" apart, ski poles can also be secured to the device.

The support posts are also preferably angled away from the pickup sidewall to enable the base of the support posts to be mounted as close as possible to the sidewall. This arrangement minimizes the loss of floor space on the pickup truck's bed.

The ski attachment assemblies are held just above sidewall level so that skis longer than the bed of the pickup truck can be supported. The ski attachment assemblies preferably include a locking device to prevent removal of the skis.

The base assemblies attaching the support posts to the pickup truck's bed preferably each include an upper base plate attached to the lower end of a support post, a lower base plate, and fasteners for attaching the upper base plate to the lower base plate through holes provided in the bed of the truck. A lock can be provided to prevent the removal of one of the fasteners, and thus lock the ski support assemblies to the bed of the pickup truck.

An advantage of this invention is that the ski rack device does not greatly reduce the amount of cargo that the pickup truck can carry. The support posts are angled to attach to the bed near the sidewalls, and are further angled to extend over the wheel well hump. The skis are carried well above the bed of the truck.

Another advantage of this invention is that skis can be locked to the bed of a pickup truck.

Another advantage of this invention is that the ski rack device is, itself, relatively immune to theft due to the locking mechanisms provided at the base assemblies of the support posts.

A still further advantage of this invention is that skis longer than the bed of the pickup truck can easily be carried.

These and other objects and advantages of the present invention will no doubt become apparent upon a reading of the following descriptions and a study of the several figures of the drawing. cl BRIEF DESCRIPTION OF THE DRAWING FIG. 1 is a perspective view of a ski rack device in accordance with the present invention.

FIG. 2 is a side elevational view of FIG. 1.

FIG. 3 is a view taken along line 3—3 of FIG. 2.

FIG. 4 is a detail view taken along line 4—4 of FIG. 2.

FIG. 5 is a detail view taken along line 5—5 of FIG. 4.

DETAILED DESCRIPTION OF THE PREFERRED EMBODIMENT(S)

Referring to FIGS. 1 and 2, a ski rack device 10 in accordance with the present invention includes a separated pair of ski carrier assemblies 12 and 14. The ski rack device 10 is shown attached to the bed 16 of a pickup truck 18 near a sidewall 20 and over the wheel well hump 22.

Since ski carrier assemblies 12 and 14 are essentially mirror images of each other, like reference numerals will refer to like members on both assemblies. A ski carrier assembly 12/14 includes an elongated support post 24, a base assembly 26 attached to a lower end of support post 24, and a ski attachment assembly 28 attached to an upper end of support post 24. As will be discussed in greater detail subsequently, base assembly 26 attaches the ski carrier assembly 12/14 to the bed of the pickup truck.

With reference to FIG. 2, the support posts 24 are angled towards each other over wheel well hump 22 so as to form an acute angle "A" with bed 16 of the truck. The angle "A" allows the upper ends of support posts 24 to grip skis 30 near their bindings 32.

With reference to FIG. 3, the support posts 24 are also angled towards the center of bed 16 so as to make an acute angle "B" with the bed. The angle "B" permits base assembly 26 to be very close to the base of sidewall 20, and yet allows the ski attachment assembly 28 to clear the upper surface 34 of sidewall 20.

Support post 24 is preferably tubular and can be made from any durable material such as metal, fiberglass, or plastic. A preferred embodiment of this invention uses tubular aluminum as the stock material.

Base assemblies 26, as mentioned previously, attach the lower ends of the support posts 24 to bed 16. With special reference to FIGS. 4 and 5, a base assembly 26 includes an upper base plate 36, a lower base plate 38, a pair of fasteners 40, and a locking mechanism 42. Upper base plate 36 is provided with elongated slots 44, and lower base plate 38 is provided with matching slots 46.

Upper base plate 36 is attached to the lower end of support post 24, preferably by welds 48. The slots 44 are aligned with apertures 50 drilled through ridges 52 of bed 16. The slots 44 permit alignment of upper base plate with the ridges of most pickup truck models. The upper base plate 36 can be in direct contact with bed 16, or a gasket material (not shown) can be placed between the upper base plate 36 and bed 16.

Lower base plate 38 is attached to upper base plate 36 by the fasteners 40 that extend through the bed 16. Referring particularly to FIG. 5, lower base plate 38 is substantially rectangular and attaches to the ridged lower surface of bed 16. Again, a gasket material (not shown) can be placed between lower base plate 38 and the bed of the pickup truck.

Fasteners 40 preferably comprise nuts, bolts, and washers. Lock washers (not shown) may be inserted between the nut and washer.

Locking mechanism 42 includes a locking stud 64 attached to lower base plate 38 at its lower end. The locking stud engages central slot 46 and is retained therein by washers 56 attached to the body of locking stud 54. An upper end of locking stud 54 is provided with a hole 58 receptive to a padlock 60.

Referring to FIG. 2, ski attachment assembly 28 includes an attachment plate 62 attached to each of the support posts 24. A non-locking support mechanism 64 is attached to plate 62 of assembly 12, and a locking support mechanism 66 is attached to plate 62 of assembly 14. Non-locking support mechanisms 64 firmly holds the rear portion of skis 30 to plates 62.

Referring to FIG. 3, locking support mechanisms 66 include a pair of co-acting jaws 70 which can be locked shut with a locking mechanism. Locking support mechanisms 66 prevent the unauthorized removal of the skis 30 from ski rack device 10.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A ski rack device for a pickup truck having a bed and a sidewall rising from a side edge of said bed, said ski rack device comprising:
    (a) a first ski carrier assembly including a first elongated support post having a first upper end and a first lower end, first base means attached proximate said first lower end and adapted to engage said bed proximate said sidewall, and first ski attachment means attached proximate said first upper end; and
    (b) a second ski carrier assembly spaced from said first ski carrier assembly and including a second elongated support post having a second upper end and a second lower end, second base means attached proximate said second lower end and adapted to engage said bed proximate said sidewall, and second ski attachment means attached proximate said second upper end; and
    (c) where said first support post and said second support post are angled away from said sidewall at an acute angle relative said bed; and
    (d) where said first support post and said second support post are angled towards each other such that said first upper end and said second upper end are relatively proximate, and said first lower end and said second lower end are relatively distal.

2. A ski rack device as recited in claim 1 wherein:
    said first base means includes a first upper base plate attached to said first lower end, and first fastener means for attaching said first upper base plate to an upper surface of said bed; and
    said second base means includes a second upper base plate attached to said second lower end, and second fastener means for attaching said second upper base plate to an upper surface of said bed.

3. A ski rack device as recited in claim 2 wherein said first fastener means includes a first locking mechanism, and said second fastener means includes a second locking mechanism.

4. A ski rack device as recited in claim 2 wherein:
    said first base means further includes a first lower base plate attached by said first fastener means to a lower surface of said bed; and
    said second base means further includes a second lower base plate attached by said second fastener means to a lower surface of said bed.

5. A ski rack device as recited in claim 4 wherein:
    said first upper base plate and said first lower base plate are provided with elongated slots receptive to said first fastener means; and
    said second upper base plate and said second upper base plate are provided with elongated slots receptive to said second fastener means.

6. A ski rack device as recited in claim 4 wherein:
    said first locking mechanism includes a first locking stud coupled at a lower end to said first lower base plate and adapted to extend through an aperture provided through said first upper base plate, said first locking mechanism being provided with means proximate its upper end that is receptive to a padlock; and
    said second locking mechanism includes a second locking stud coupled at a lower end to said second lower base plate and adapted to extend through an aperture provided through said second upper base plate, said second locking mechanism being provided with means proximate its upper end that is receptive to a padlock.

7. A ski rack device as recited in claim 1 wherein:

said first ski attachment means is positioned no lower than the upper edge of said sidewall; and said second ski attachment means is positioned no lower than the upper edge of said sidewall.

8. A ski rack device as recited in claim 1 wherein:

said first ski attachment means includes a first locking mechanism which can prevent removal of skis from said device, and said second ski attachment means includes a second locking mechanism which can prevent removal of skis from said device.

9. A ski rack device for a pickup truck having a bed, a sidewall rising from an edge of said bed, and a wheel well hump rising from said bed proximate said sidewall, said ski rack comprising a separated pair of support assemblies each including:

(a) an elongated support post having an upper end and a lower end;

(b) means attaching said lower end to said bed; and (c) means attaching skis to said upper end (d) where said elongated support post is angled away from said sidewall.

10. A ski rack device as recited in claim 9 wherein: said elongated support post is angled to extend over said wheel well hump.

11. A ski rack device as recited in claim 9 wherein: said means attaching said lower end to said bed includes a locking mechanism.

12. A ski rack device as recited in claim 9 wherein: said means attaching skis to said upper end includes a locking mechanism.

13. A ski rack device as recited in claim 9 wherein said means attaching skis to said upper end includes a lock mechanism which prevents unauthorized removal of said skis from said device.

* * * * *